United States Patent [19]

Deutsch

[11] 4,313,361

[45] Feb. 2, 1982

[54] DIGITAL FREQUENCY FOLLOWER FOR ELECTRONIC MUSICAL INSTRUMENTS

[75] Inventor: Ralph Deutsch, Sherman Oaks, Calif.

[73] Assignee: Kawai Musical Instruments Mfg. Co., Ltd., Hamamatsu, Japan

[21] Appl. No.: 135,054

[22] Filed: Mar. 28, 1980

[51] Int. Cl.[3] .................... G01H 1/00

[52] U.S. Cl. .................... 84/1.01; 84/454; 84/DIG. 18; 84/1.03; 324/78 D; 364/724

[58] Field of Search .................... 179/15 A, 15 C; 324/78 D; 364/724; 84/1.01, 1.03, 454, DIG. 18

[56] References Cited

U.S. PATENT DOCUMENTS

| | | | |
|---|---|---|---|
| 3,803,390 | 4/1974 | Schaepman | 364/724 |
| 4,021,653 | 5/1977 | Sharp et al. | 364/724 |
| 4,106,102 | 8/1978 | Desblacite | 364/724 |
| 4,280,387 | 7/1981 | Moog | 84/454 |

*Primary Examiner*—David Smith, Jr.
*Assistant Examiner*—Forester W. Isen
*Attorney, Agent, or Firm*—Ralph Deutsch

[57] ABSTRACT

In an electronic musical instrument apparatus is provided for generating musical sounds having a fundamental frequency which tracks the fundamental frequency of a time varying external control signal. A matched filter is used to generate frequency control signals which are determined by a closeness criterion between the external control signal and an internally generated test signal. Provision is made for offsetting the generated musical sounds for a preselected musical interval from the fundamental frequency of the external control signal.

11 Claims, 6 Drawing Figures

DIGITAL FREQUENCY FOLLOWER FOR ELECTRONIC MUSICAL INSTRUMENTS

BACKGROUND OF THE INVENTION

1. Field of the Invention

This invention relates broadly in the field of electronic musical tone generators and in particular is concerned with the provision for a digital frequency follower for a musical instrument.

2. Description of the Prior Art

A problem commonly encountered in signal processing systems is to provide a means for determining the fundamental frequency of a complex input periodic signal. Sometimes the object is to simply determine the fundamental frequency while other times the determined fundamental frequency is used as an input to other systems. An example of the second system object is found in the variety of musical devices which are called by the generic name of "frequency followers."

The tone changer is an example of a frequency follower system. In a tone changer, the acoustic signal from a musical instrument such as a flute or saxaphone is converted into an electrical signal by means of a microphone that is usually inserted into a hole drilled in the musical instrument. Analog circuitry is used to force an oscillator to operate at the current fundamental frequency played on the musical instrument. The signal produced by this oscillator is then used as an input frequency control signal to an electronic tone synthesizer. The tone synthesizer usually operates at the fundamental frequency of the oscillator or at suboctaves which are readily obtained by means of conventional frequency dividers operating on the oscillator's output signal. The net effect is that the musician plays his acoustic instrument in the usual fashion while the frequency follower and tone synthesizer combination system provide an accompaniment which has a different and selectively adjustable tone color and may be selectively at the unison pitch or at some suboctave.

The analog frequency determining element used in tone changers is generally selected as some variation of a phase locked oscillator. Such devices work best when the input signal approximates a simple periodic waveshape such as a sinusoid shape. For this reason, tone changers using frequency followers have been most successful when used in conjunction with musical instruments having tone colors containing relatively few harmonics. For acoustic musical instruments having tones with an extended harmonic structure, a low pass filter is often employed prior to the phase locked oscillator so that the higher harmonics are attenuated to produce a simpler signal.

The use of a low pass filter to reduce tonal complexity places a musical limitation on the tone changer. With a filter it is necessary for the musician to preselect the octave ranges that will be played.

A common problem shared by frequency followers is the time required for the frequency determination system to change frequency in response to a change in the frequency of the input signal.

It is a feature of this invention that a digital frequency follower is used in a novel manner to provide the functions previously obtained using analog circuitry without some of the limitations encountered with state of the art frequency follower and tone changer combination systems.

SUMMARY OF THE INVENTION

The present invention is directed to a novel and improved arrangement for determining the frequency of a musical input signal and which can be utilized by an electronic musical instrument to produce a variety of musical effects.

In brief, this is accomplished by converting the input analog signal from an acoustical musical instrument into a sequence of sampled signals. The sampled signals are provided to two matched filters. One of the matched filters is configured as an even transversal filter and the other matched filter is configured as an odd transversal filter. The output signals from the two matched filters are squared and added together. The sum signal is converted to a digital signal by means of a analog-to-digital converter and used as an input to a data comparator. The sampling rate of the input analog signal is varied in a programmed fashion until the data comparator indicates that a maximum value has been attained.

The sampling rate is determined by a non-integer frequency divider. This divider operates by successively adding a selected frequency number in an adder accumulator. The overflow signals caused by the modulo action of the accumulator provide the timing signals for the sampling of the input analog signals. The frequency number coresponding to the maximum signal detected by the comparator corresponds to the fundamental frequency of the input analog musical signal. The frequency number can be used as a frequency determining element of an electronic musical tone generator. By employing simple arithemetical operations on the frequency number, the tone generator can be made to operate at either the fundamental frequency or at other prespecified frequency intervals.

It is an objective of the present invention to generate a frequency number which corresponds to the fundamental freuency of an input complex periodic signal.

It is another objective of the present invention to provide a frequency determination system which has a fast response to changes in the input signal.

It is still another objective of the present invention to provide a frequency determining number to a musical tone generator whereby the tone generator is caused to create musical tones at some preselected musical interval in response to a master musical instrument used as a signal source.

BRIEF DESCRIPTION OF THE DRAWINGS

For a better understanding of the invention reference should be made to the accompanying drawings.

DETAILED DESCRIPTION OF THE INVENTION

The present invention is directed to an apparatus for detecting the fundamental frequency of a complex musical tone and for generating a corresponding frequency number which can be used as the frequency controlling signal in an electronic musical instrument.

Figure 1:
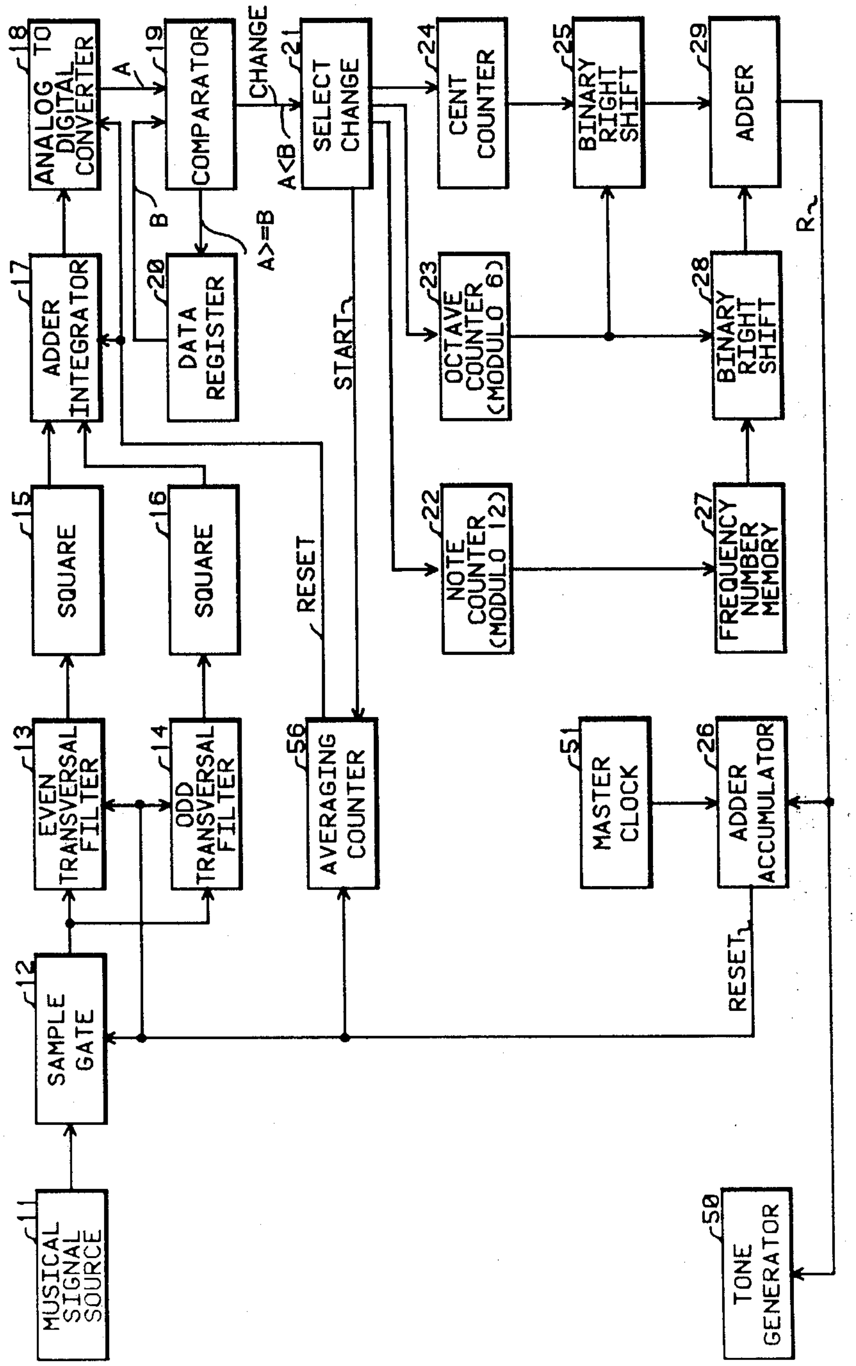
FIG. 1 is a schematic diagram of an embodiment of the invention.

FIG. 1 shows an emobidment of the present invention which detects the fundamental frequency of a complex musical tone and generates a corresponding frequency control number. One of the novel features is the use of matched filters for signal processing in an arrangement to detect the fundamental frequency of the input signal.

The musical source 11 can be almost any electrical source of musical tone waveshapes such as an acoustic musical instrument for which the audible sound is converted into an electrical signal by means of a transducer such as a microphone. The invention is not limited to musical waveforms and it can be used with a wide variety of input signals which are periodic. The input signal may have a time varying fundamental frequency.

Sample gate 12 is used to select samples of the signal furnished by the musical signal source 11 at a rate determined by the reset, or overflow, signals generated by the adder-accumulator 26. The selected samples are called sample signals.

A frequency number R, generated by a method described below, is successively and repetitively added to the contents of the accumulator in the adder-accumulator 26 at a rate determined by the master clock 51. The frequency number R is advantageously selected to have a decimal value less than one. Master clock 51 generates the logic timing signals for all the digital logic elements of the system shown in FIG. 1. Each time that the contents of the accumulator are incremented to equal or exceed the decimal value of one, a reset signal is generated. The action of successive and repetitive additions of a frequency number R which is less than or equal to one constitutes a non-integer frequency divider whose timing signal is the reset signal from the accumulator.

The even transversal filter 13 and the odd transversal filter 14 can be implemented using a CCD (charge coupled device) such as the R5602 transversal filter manufactured by the Reticon Corporation, 910 Benicia Ave., Sunnyvale, Calif. This device is a mask programmable microelectronic element in which split electrodes are fabricated to form capacitors whose capacitance is related to the desired tap weight function. The tap weight function is a scaler multiplier which attenuates the signal device from an analog shift register to provide an output signal at a signal output terminal. As the input sampled signal provided by the sample gate 12 is shifted along the CCD, it induces current in these capacitors which is proportional to the tap weight and the signal amplitude.

Figure 2:
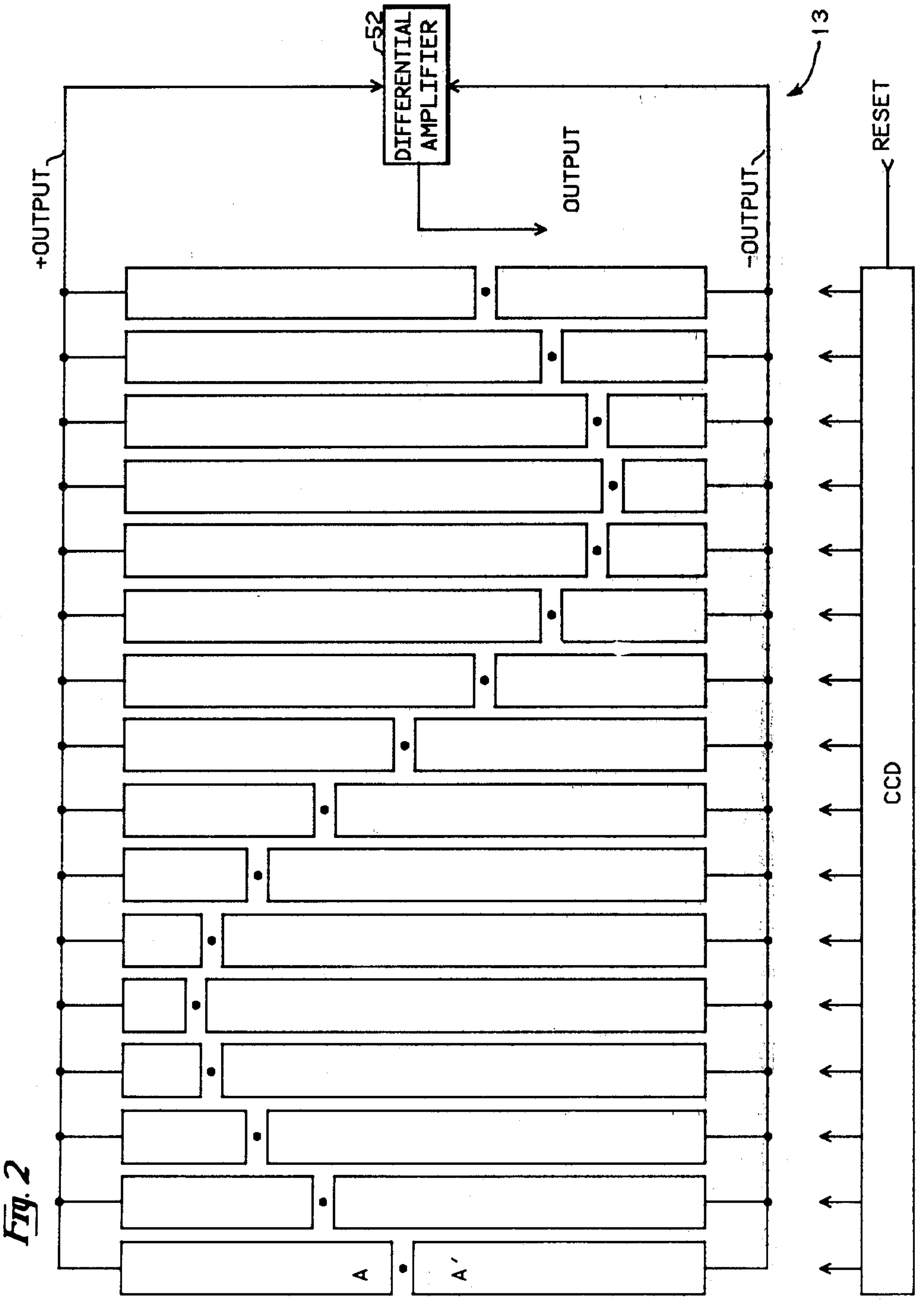
FIG. 2 is a schematic diagram of a split electrode CCD transversal filter.

A conceptual schematic of a CCD transversal filter is shown in FIG. 2. Each terminal output, or filter tap, from the CCD is shown as a dot in the upper half of the drawing. For each output terminal from the CCD, there is a split electrode A-A[1] which forms a fixed capacitance which provides predetermined proportions of the input terminal signal to the positive and negative input terminals of the differential amplifier 52. The sampled input data signals are shifted along the CCD at a rate determined by the RESET signal from the adder accumulator 26. The arrows from the taps on the CCD are associated with the dots between the capacitor electrodes on the upper part of the drawing.

All of the signal outputs from each half of the electrode structures are summed together and then the summed signals from both sides are subtracted in the differential amplifier 52.

While almost any number of taps can be used to configure a transversal filter, it is convenient to implement practical devices with the number of terminals equal to a power of two. It has been found advantageous to use filters containing 64 output terminals, or output taps.

The even transversal filter is implemented with tap weights calculated according to the relation $$x_n = \sum_{q=1}^{64} P(q)\cos(\pi nq/32) \qquad \text{Eq. 1}$$

The odd transversal filter is implemented with tap weights calculated according to the relation $$y_n = \sum_{q=1}^{64} P(q)\sin(\pi nq/32) \qquad \text{Eq. 2}$$

n is an integer index which denotes the tap positions in sequence along the CCD. Advantageously 64 tap positions are used for the CCD. The phase numbers P(q) have the values +1 or −1. These numbers are selected as described in U.S. Pat. No. 4,085,644 entitled "Polyphonic Tone Synthesizer," which is hereby incorporated by reference. Selecting the values of P(q) as described in the referenced patent will result in a maximum RMS value for the set of values $x_n$ and $y_n$ for a given peak signal value limitation.

The following set of values for the phase numbers have been experimentally verified to produce satisfactory results:

−1, −1, −1, −1,
−1, −1, −1, −1, 1, 1, 1, −1, −1, −1, 1, 1
−1, −1, 1, 1, −1, 1, 1, −1, 1, −1, −1, 1, −1, 1, −1, 1
−1, −1, −1, −1, −1, −1, −1, −1, 1, 1, −1, −1, −1, 1, 1
−1, −1, 1, 1, −1, 1, 1, −1, 1, −1, −1, 1, −1, 1, −1, 1

These are the values listed in the referenced patent. The alternative set of phase numbers listed below have also been verified to produce satisfactory results:

1, −1, 1, 1, 1, −1, −1, 1, 1, −1, 1, 1, 1, 1, 1, 1
1, 1, −1, −1, 1, −1, 1, −1, −1, −1, 1, 1, −1, 1, −1, −1,
1, −1, 1, 1, 1, −1, −1, 1, 1, −1, 1, 1, 1, 1, 1, 1
1, 1, −1, −1, 1, −1, 1, −1, −1, −1, 1, 1, −1, 1, −1, −1

The use of the phase numbers P(q) selected in the specified manner causes $x_n$ and $y_n$ to resemble a noise-like set of waveform data instead of a narrow pulse-like waveform which would result by choosing all the phase number to be either +1 or −1.

The output signal from the even transversal filter is multiplied in magnitude by its own magnitude in square 15 to form the squared magnitude and is added in adder-integrator 17 to a similarly squared signal from the output of the odd transversal filter 14 produced by the square 16. The summed values are integrated by means of an analog signal integrator.

The square devices 15 and 16 can be implemeted by means of a device such as the model AD5311 programmable multiplier/divider device manufactured by Analog Devices, Inc., Route One Industrial Park, Norwood, Mass. This device is an analog signal multiplier which can be used to provide the squared magnitude of an input signal.

The analog output signal from the adder-integrator 17 is converted into a binary digit form by means of the analog-to-digital convertor 18 and supplied as one input to the comparator 19. This input signal is designated by A in FIG. 1. The second input to the comparator is the current state B of the contents of the data register 20.

The state of the data register 20 can be initialized at the start of a frequency determination cycle. If the current output A from the analog-to-digital convertor 18 is greater than or equal to the number B in the data register 20, the convertor output data A is used to replace the prior content B in the data register 20. In this fashion the number contained in the data register will be the maximum of all numbers converted during a frequency determination cycle.

If the current output value A from the analog-to-digital convertor 18 is less than the value B in the data register 20, a CHANGE signal is generated and provided to the select change 21. The details of the select change 21 are shown in FIG. 2 and are described later. The function of the select change 21 is to select values of the frequency numbers which are added repetitively, as described above, to the contents of the adder-accumulator 26 to create the RESET signal which controls the signal sampling action of the sample gate 12.

In response to a control signal from the select change 21, the note counter 22 is used to address out one of 12 stored frequency numbers stored in the frequency number memory 27. The 12 numbers stored in the frequency number memory correspond to the 12 notes in the equal tempered musical octave and are computed according to the relation $$R_{13-i}=2^{(i-1)/12}; i\ 32\ 1,2,\ldots,12 \qquad \text{Eq. 3}$$

The octave counter 23 is used to control the binary right shift 28 in response to a control signal provided by the select change 21. The state of the octave counter 23 causes the binary right shift 28 to produce a right shift on the frequency numbers addressed out from the frequency number memory 27 so that the frequency number is divided by powers of two to correspond to selected musical octaves.

Because the musical signal source 11 is not limited to precise musical note frequencies, a provision is incorporated to offset the true musical frequencies to match the detuning of the fundamental tone from the input source. This detuning is accomplished by means of the cent counter 24 which is used to generate offsets from the true musical frequencies. Since there are 100 cents between each note in the musical scale, maximum frequency resolution is obtained if the cent counter is implemented to count modulo 100. In practice, it is found that sufficient accuracy is attained if each increment to the cent counter 24 causes it to increment by 4 count states.

The binary right shift 25 divides the cent data provided by the cent counter 24 by a power of two in response to the state of the octave counter 23.

The output values from the binary right shift 25 and the binary right shift 28 are summed in the adder 29 to form the frequency number R which is provided as the input to the adder accumulator 26. As previously described, the frequency number R is repetitively added to itself in the adder-accumulator 26 at each logic clock time furnished by the master clock 51. The resulting overflow, or reset, pulses of the accumulator occur at an averge rate corresponding to the current frequency state in the frequency detection cycle.

Figure 3:
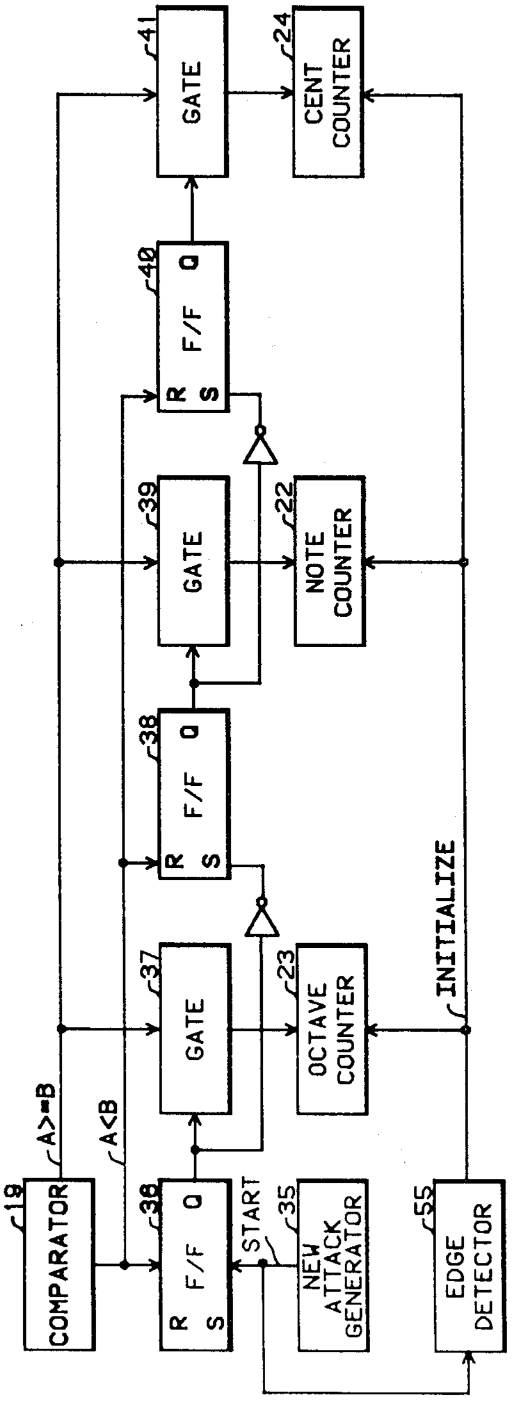
FIG. 3 is a schematic drawing of the select change system.

FIG. 3 illustrates an implementation of the select change 21. There are a variety of different frequency search modes that could be implemented to search for the unknown fundamental frequency from the musical signal source during a frequency detection cycle. The illustrative system implementation shown in FIG. 3 first scans each of the octaves. When a maximum is found at any of the octaves selected in turn, a search is then made for a maximum for musical notes within the octave providing the octave maximum. Finally, when the musical note is found which produces a maximum from the comparator 19, a search is made to find the cents offset that produces a maximum from the comparator for the cent deviations from the musical note that provided the prior maximum.

Other alternative frequency scan modes to find the maximums of octave, note, and cents can be readily implemented. For example, the frequency scan can start with the lowest octave and the maximum is selected from the 12 notes of the musical scale. When this maximum is found, a shift is made to the next highest octave followed by a scan of the musical notes. This process is continued until the octave and musical note is found that gives the largest maximum value at the output of the comparator 19. Finally, the maximum is scanned to find the nearest cent offset from the true musical frequency.

The select change 21 shown in FIG. 3 consists of the logic blocks: flip-flop 36, gate 37, flip-flop 38, gate 39, flip-flop 40, gate 41, and new attack generator 35.

The start of a new note is detected buy the new attack generator 35 which creates a START signal. The START signal is used to initiate a frequency determination cycle.

The START signal is converted to a pulse signal by means of the edge detector 55 to create an INITIALIZE signal. The INITIALIZE signal is used to reset the states of the octave counter 23, the note counter 22, and the cent counter 24 so that all the counters are reset at the start of a frequency determination cycle.

When the start of a new musical note is detected, the frequency determination cycle is initiated by the setting of flip-flop 36 in response to the START signal. When flip-flop 36 is set the output state Q="1" causes the signal created by comparator 19 for the case $A \geqq B$ to be transferred via gate 37 to increment the state of the octave counter 23. A represents the value of the current output from the analog-to-digital convertor 18 and B represents the current data value stored in the data register 20.

If the condition $A < B$ is found by the comparator 19, flip-flop 36 is reset to cause the output state Q="0". The state Q="0" prevents gate 37 from transmitting signals to increment the octave counter 23. The change of state of the flip-flop 36 to Q="0" causes the flip-flop 38 to be set so that its output state becomes Q="1".

When flip-flop 38 is set, the output state Q="1" causes gate 39 to transfer signals furnished by the comparator 19 for the case $A \geqq B$ to increment the note counter 22. Flip-flop 38 is reset when the comparator 19 detects the signal values $A < B$.

The action of resetting the flip-flop 39 prevents further incrementing of the note counter 22 and sets the flip-flop 40.

When flip-flop 40 is set, the signals provided by the comparator 19 for the cases in which $A \geqq B$ are transmitted through gate 41 to increment the cent counter 24.

The frequency determination cycle is terminated when the comparator 19 detects a comparison $A < B$ and thereby resets the flip-flop 40 and terminates the incrementing of the cent counter 24.

The number of cycles of averaging time is determined by the averaging counter 56. The averaging counter is reset to its initial state by means of the START signal generated by the select change 21 in the manner previously described. If the matched filter data is to be averaged for six cycles, for example, then the averaging counter is implemented to count modulo 6×N. N=64 is the number of tap positions used in the CCD used to implement the transversal filters 13 and 14. The averaging counter 56 is incremented by the RESET signals provided by the adder-accumulator 26. When the averaging counter 56 is returned to its initial count state because of its modulo counting action a RESET signal is generated and provided to both the adder-integrator 17 and the analog-to-digital convertor 18. In response to this RESET signal the analog-to-digital convertor converts the current analog signal at the output of the integrator in the adder-integrator 17. After this analog signal has been converted to a binary digital number, the RESET signal initializes the signal state of the integrator.

As the number of integration cycles increases, so does the accuracy and sensitivity of the frequency determination as manifested in the sharpness of the maximum value detected by the comparator 19. Unfortunately the sensitivity is increased with the number of integration cycles which slows down the system response so that it becomes difficult to frequency track input musical signals that are changing in pitch. Six integration cycles has been found to be a good compromise between response speed and frequency determination accuracy.

The new attack generator 35, shown in FIG. 3, can be implemented in several ways for various musical signal sources. If the musical signal source is a keyboard musical instrument, then the new attack generator can simply be a keyboard switch contact. If the source is acoustic in nature, then the new attack generator can be implemented as an amplifier arrangement following a microphone transducer. When the amplitude signal level exceeds some pedetermined threshold level, a START signal can be generated which is used as previously described to initiate a frequency determination cycle.

Figure 4:
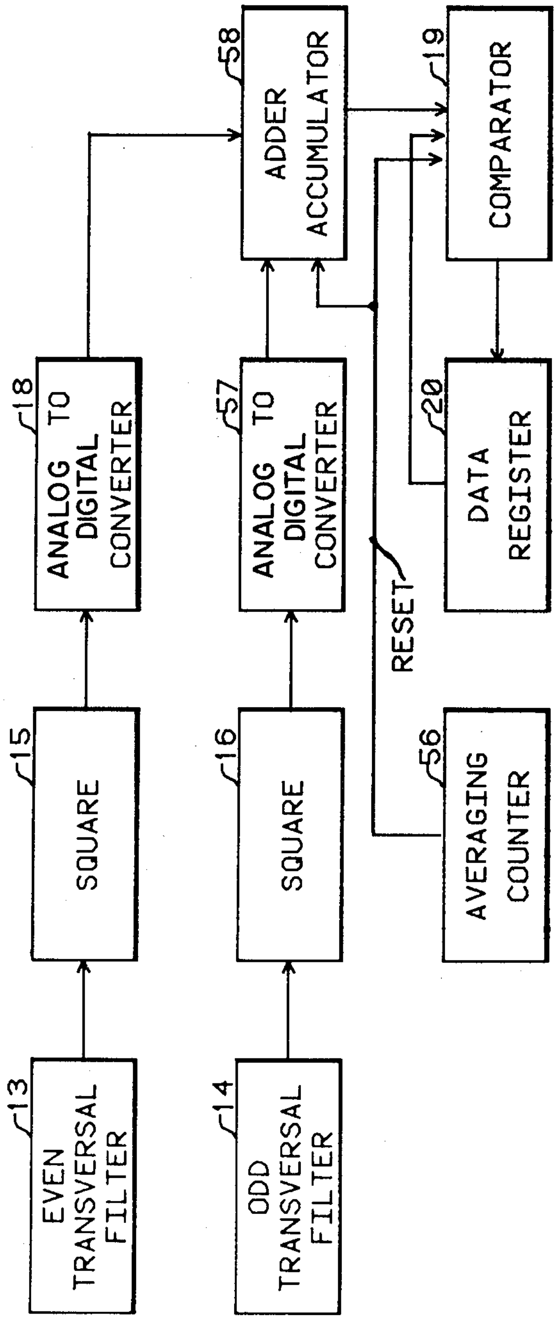
FIG. 4 is an alternative embodiment of the invention.

FIG. 4 shows an alternative embodiment of the invention. In FIG. 4, the function of adding and signal integration has been removed from the analog signal processing and has been implemented in the digital signal processing portion of the system. The analog signals from the square 15 and square 16 are converted to binary digital signals by means of the analog-to-digital converter 18 and the analog-to-digital convertor 57. The two digital outputs are summed in the adder-accumulator 58 and accumulated for successive times as determined by the master clock 51. The analog-to-digital convertors are also operated at the same master clock rate. The RESET signal generated by the averaging counter 56 is used to transfer the contents of the accumulator in the adder-accumulator 58 to the comparator 19. After this data transfer has been made, the accumulator is initialized in response to the RESET signal.

The particular form of the transversal filters 13 and 14 used as matched filters was chosen as indicated by Eq. 1 and Eq. 2 to accomodate musical waveforms whose harmonic structure is unknown. If the input musical waveforms are known, or have a known harmonic structure, then other implementations of the matched filter weighting functions can be used.

It is known in the signal theory art that a matched filter will provide for a noisy input signal an output signal that has a maximum signal-to-noise power ratio. In fact, a commonly used definition for a matched filter is a filter which maximizes the output signal-to-noise power ratio for a noisy input signal. Moreover it is known that the matched filter's impulse response is a reverse image of the input signal. A discussion of these well-known properties can be found on page 163 of the book: Ralph Deutsch, *Systems Analysis Tecniques,* Englewood Cliffs, N.J., Prentice- Hall, Inc., 1969. The output signal from a matched filter will be called a matched signal. As noted in the referenced book, a matched filter does not preserve the shape of the input signal and thus the matched signal does not have the same shape as the input signal.

Figure 5:
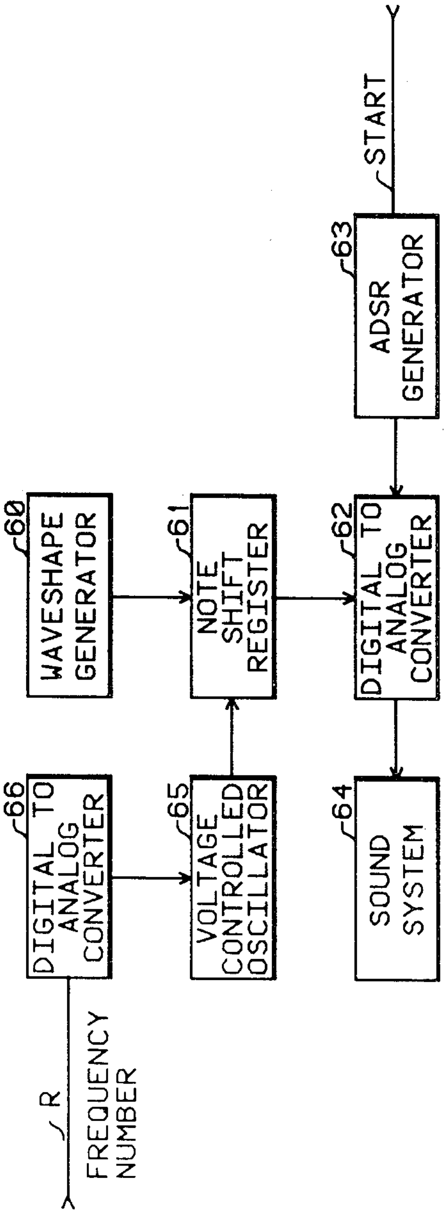
FIG. 5 is a schematic diagram of a tone generator.

FIG. 5 illustrates details of the tone generator 50 shown in FIG. 1. The wave shape generator 60 can be implemented as described in the referenced U.S. Pat. No. 4,085,644. The waveshape generator 60 generates a set of digital values corresponding to equally spaced sample points for one complete period of the fundamental of a musical tone. This generated set of digital values is transferred and stored in a note shift register 61. The data stored in the note shift register 61 is sequentially read out at a rate determined by the voltage controlled oscillator 65. The frequency of the voltage controlled oscillator is determined by the magnitude of the frequency number R as converted to an analog value by means of the digital-to-analog convertor 66.

Methods for using a frequency number to control the frequency of an oscillator are described in U.S. Pat. No. 4,067,254 entitled "Frequency Number Controlled Clocks" which is hereby incorporated by reference.

The digital data values read out of the note shift register 61 at the rate determined by the voltage controlled oscillator 65 are converted to analog values by means of the digital-to-analog convertor 62 and provided to the sound system 64.

The ADSR generator 63 is used to provide envelope modulations to the generated musical tones. The ADSR generator provides modulations corresponding to the attack, decay, sustain, and release segments of a musical tone.

Almost any ADSR generator system can be used to implement the ADSR generator 63. A suitable system is described in U.S. Pat. No. 4,079,650 entitled "ADSR Envelope Generator" which is hereby incorporated by reference.

Figure 6:
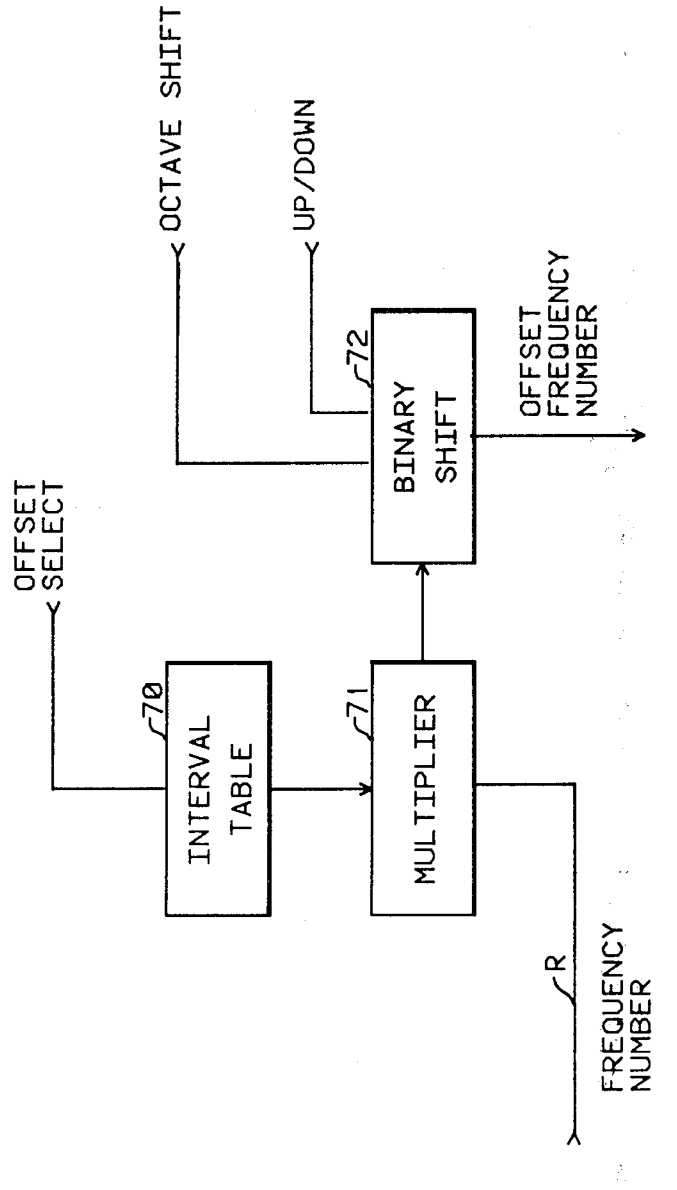
FIG. 6 is a schematic diagram of the frequency number modifier.

FIG. 6 shows circuitry for modifying the frequency number R before it is used by the tone generator 50. For most musical applications the tone generator is operated so that it produces a musical tone at the same fundamental frequency as that of the input musical source. However, it is frequently desirable to generate an accompaniment tone at other musical intervals such as an octave, musical third, minor third, or fifth.

The interval table 70 is an addressable memory storage musical interval values, or offset frequencies. These can consist of the values:

| musical interval | interval value |
|---|---|
| unison | 1.000000 |
| minor third | 1.189207 |
| third | 1.259221 |
| fifth | 1.498307 |

An interval value is read out of the interval table in response to an offset select signal. The offset select signal can be generated by means of a multi-position selector switch.

The selected interval value is multiplied by the frequency number R by means of the multiplier 71. The product value can be shifted up or down a preselected number of octaves by means of the binary shift 72. An increase in the octave is obtained by a binary left shift while an octave decrease is obtained by a binary right shift. A shift of one bit causes one octave change. The direction of the shift is controlled by the up/down signal while the number of bits shifted is controlled by the octave shift signal. The resultant offset frequency number is used as the input frequency number to the tone generator 50.

It is obvious that a variety of tone generation means can be used in the tone generator 50 including sliding formants as well as to employ rhythm generators to key the generated tones in a prespecified rhythmic fashion.

I claim:

1. Aapparatus for determining the fundamental frequency of a periodic signal comprising;

a frequency generating means for generating a sample timing signal in response to an output frequency number, a sampling means responsive to said sample timing signal for generating a sequence of sample signals having amplitude values corresponding to said periodic signal, a matched filter means for generating a matched signal in response to said sequence of sample signals, a convertor means for converting said matched signal to a sequence of binary digital numbers, a frequency number memory storing a plurality of frequency numbers, a selection means whereby a member of said plurality of frequency numbers is addressed from said frequency number memory in response to said sequence of binary digital numbers and wherein frequency modification signals are generated, and a frequency modification means responsive to said frequency modification signals wherein said addressed member of said plurality of frequency numbers is modified in numerical value to create said output frequency number corresponding to the fundamental frequency of said periodic signal.

2. Apparatus according to claim 1 wherein said matched filter means comprises;

a transversal filter means comprising an even transversal filter and an odd transversal filter, a first signal square means for providing the squared magnitude of the output of said even transversal filter in response to said sequence of sample signals, a second signal square means for providing the squared magnitude of the output of said odd transversal filter in response to said sequence of sample signals, and an adder-integrator means for adding a predetermined number of successive output signals provided by said first signal square means to said second signal square means thereby generating said matched signal.

3. Apparatus according to claim 2 wherein said transversal filter means further comprises;

an even transversal filter having a number N of output terminals, responsive to said sequence of sample signals wherein the output sample signal at an output terminal is equal to the input sample signal multiplied by the tap weight $x_n$ calculated according to the relation $$x_n = \sum_{q=1}^{N} P(q) \cos(\pi nq/N),$$

where n=1,2, . . . , N is an integer denoting the index number of a transversal filter tap, P(q) is a constant having preselected values of +1 or −1, and an odd transversal filter, having a number N of output terminals, responsive to said sequence of sample signals wherein the output sample signal at an outut terminal is equal to the input sample signal multiplied by the tap weight $y_n$ calculated according to the relation.

$$y_n = \sum_{q=1}^{N} P(q) \sin(\pi nq/N).$$

4. Apparatus according to claim 1 wherein said selection means further comprises;

a memory means for storing a selected member of said sequence of binary digital numbers to be thereafter read out, a comparator means responsive to said sequence of binary digital numbers and to said selected member stored in said memory means wherein a change signal is generated if said selected member has a value less than the value of a number in said sequence of binary digital numbers, and a memory writing means wherein in response to said change signal said element of said sequence of digital numbers is stored in said memory means.

5. Apparatus according to claim 4 wherein said selection means further comprises;

a count signal generation circuitry whereby a count signal is generated in response to said sequence of binary numbers, a start generator means for generating a start signal, an octave counter means incremented by said count signal wherein said octave counter means is initialized to a minimum count state in response to said start signal, a note counter means incremented by said count signal wherein said note counter means is initialized to a minimum count state in response to said start signal, a cent counter means incremented by said count signal wherein said cent counter means is initialized to a minimum count state in response to said start signal, an octave gate control means wherein an octave signal is generated in response to said start signal and wherein said octave signal generation is terminated if said change signal is not generated, a note gate control means wherein a note signal is generated in response to said octave signal and wherein said note signal generation is terminated if said change signal is not generated, a cent gate control means wherein a cent signal is generated in response to said note signal and wherein said cent signal generation is terminated if said change signal is not generated, an octave count gate interposed between said count signal generation circuitry and said octave count means whereby said count signal is transferred to said octave counter means in response to said octave signal, a note count gate interposed between said count signal generation circuitry and said octave counter means whereby said count signal is transferred to said note counter means in response to said note signal, and a cent count gate interposed between said count signal generation circuitry and said cent counter means whereby said count signal is transferred to said cent counter means in response to said cent signal.

6. Apparatus according to claim 5 wherein frequency modification means comprises;

a frequency addressing circuitry whereby a frequency number is addressed from said frequency number memory in response to the count state of said note counter means, octave scaling means responsive to contents of said octave counter means wherein said frequency number addressed from said frequency number memory is scaled in value in response to the count state of said octave counter means, a cent scaling means responsive to contents of said octave counter means wherein contents of said cent counter means is scaled in value in response to the count state of said octave counter means, and an adder for generating the sum of the output of said octave scaling means and the output of said cent scaling means thereby creating said output frequency number.

7. Apparatus according to claim 1 wherein said frequency generating means comprises;

a master clock for generating timing signals, and an adder-accumulator means, operative at each said timing signal, wherein said output frequency number is added to the sum previously contained in the adder-accumulator and wherein the adder-accumulator means generates said sample signal whenever the accumulator is incremented beyond its maximum state.

8. Apparatus according to claim 2 wherein said frequency generating means comprises;

an averaging counter means incremented by said sample signals whereby an averaging reset signal is generated when the count state of said averaging counter means is incremented to a predetermined count state, and reset circuitry responsive to said averaging reset signal whereby contents of said adder-integrator means are initialized.

9. An electronic musical instrument wherein the fundamental frequency of musical sounds are generated in response to a frequency varying input signal comprising;

a frequency generating means for generating a sample timing signal in response to an output frequency number, a sampling means responsive to said sample timing signal for generating a sequence of sample signals having amplitude values corresponding to said frequency varying input signal, a matched filter means for generating a matched signal in response to said sequence of sample signals, a convertor means for converting said matched signal to a sequence of binary digital numbers, a frequency number memory storing a plurality of frequency numbers, a selection means whereby a member of said plurality of frequency numbers is addressed from said frequency number memory in response to said sequence of binary digital numbers and wherein frequency modification signals are generated, a frequency modification means responsive to said frequency modification signals wherein said addressed member of said plurality of frequency numbers is modified in numerical value to create said output frequency number corresponding to the fundamental frequency of said frequency varying input signal, and utilization means responsive to said output frequency number whereby said musical sounds are generated having a frequency corresponding to said frequency varying input signal.

10. An electronic musical instrument according to claim 9 wherein said utilization means comprises;

a musical wave shape generator for generating a sequence of data values corresponding to equally spaced points for a period of a musical sound, a memory means for storing said data values to be thereafter read out, a variable frequency timing generator wherein a sequence of timing signals is generated in response to said output frequency number, an addressing means responsive to said sequence of timing signals whereby said data values are addressed out from said memory means, envelope modulation means whereby said addressed out data values are scaled in magnitude, and conversion means whereby said scaled magnitude data values are converted to audible sounds.

11. An electronic musical instrument according to claim 10 wherein said variable frequency timing generator comprises;

an interval memory for storing a plurality of frequency offset constants, offset circuitry for addressing out a selected member of said plurality of frequency offset constants from said interval memory, an offset multiplier for providing the product of said selected member of said plurality of frequency offset constants and said output frequency number, and octave offset means for scaling said product provided by said offset multiplier thereby generating an offset frequency number.

* * * * *